(12) United States Patent
Bichkar et al.

(10) Patent No.: US 11,746,838 B1
(45) Date of Patent: *Sep. 5, 2023

(54) SYSTEM AND METHOD FOR ADAPTING DRIVELINE DISCONNECT CLUTCH OPERATION

(71) Applicant: Ford Global Technologies, LLC, Dearborn, MI (US)

(72) Inventors: Akshay Bichkar, Ann Arbor, MI (US); Corey James Blue, Belleville, MI (US); Samuel Melville Glauber, Northville, MI (US); Joseph F. Kucharski, Livonia, MI (US); Jason Meyer, Canton, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,768

(22) Filed: Aug. 31, 2022

(51) Int. Cl.
*F16D 48/06* (2006.01)
*B60W 20/00* (2016.01)

(52) U.S. Cl.
CPC .......... *F16D 48/066* (2013.01); *B60W 20/00* (2013.01); *B60W 2510/081* (2013.01); *F16D 2500/10412* (2013.01); *F16D 2500/3024* (2013.01); *F16D 2500/3067* (2013.01); *F16D 2500/504* (2013.01)

(58) Field of Classification Search
CPC .................. F16D 48/066; F16D 48/10; F16D 2500/10412; F16D 2500/3024; F16D 2500/3067; F16D 2500/504; B60W 20/00; B60W 2510/081
See application file for complete search history.

(56) References Cited

U.S. PATENT DOCUMENTS

| | | | |
|---|---|---|---|
| 8,303,463 B2 * | 11/2012 | Sah ...................... | F16H 61/0206 477/158 |
| 8,538,643 B1 | 9/2013 | Wang et al. | |
| 8,738,217 B2 | 5/2014 | Banker et al. | |
| 10,661,784 B2 | 5/2020 | Ford et al. | |
| 10,800,396 B2 | 10/2020 | Ford et al. | |
| 2005/0107201 A1 * | 5/2005 | Cicala ................... | F16H 61/061 475/116 |
| 2018/0171977 A1 * | 6/2018 | Kjær ..................... | F03D 7/0276 |

(Continued)

FOREIGN PATENT DOCUMENTS

WO 2014195089 A1 12/2014

OTHER PUBLICATIONS

Bichkar, A. et al., "Dynamic Adaption Methods and System for a Driveline Disconnect Clutch," U.S. Appl. No. 17/643,708, filed Dec. 10, 2021, 40 pages.

(Continued)

*Primary Examiner* — Edwin A Young
(74) *Attorney, Agent, or Firm* — David Kelley; McCoy Russell LLP

(57) ABSTRACT

Systems and methods for operating a driveline disconnect clutch of a hybrid vehicle are presented. In one example, a time duration of a boost phase of a driveline disconnect clutch closing sequence is adjusted in response to one or more error values. The error values may include pressure error, integrated pressure error, and electric machine speed error.

20 Claims, 4 Drawing Sheets

(56) References Cited

U.S. PATENT DOCUMENTS

2020/0386279 A1\* 12/2020 Choi .................. F16D 25/14

OTHER PUBLICATIONS

Bichkar, A. et al., "Dynamic Adaption Methods and System for a Driveline Disconnect Clutch," U.S. Appl. No. 17/643,715, filed Dec. 10, 2021, 40 pages.
Bichkar, A. et al., "Driveline Disconnect Clutch Operating Methods and System," U.S. Appl. No. 17/643,754, filed Dec. 10, 2021, 43 pages.

\* cited by examiner

SYSTEM AND METHOD FOR ADAPTING DRIVELINE DISCONNECT CLUTCH OPERATION

FIELD

The present description relates to methods and a system for adapting operation of a driveline disconnect clutch of a hybrid vehicle.

BACKGROUND AND SUMMARY

A driveline disconnect clutch of a hybrid vehicle may be selectively opened and closed during vehicle operation. The driveline disconnect clutch may be opened when driver demand is low and it may be closed when driver demand is high. The driveline disconnect clutch may be commanded closed from a fully open or nearly fully open state. For example, the driveline disconnect clutch may be commanded closed from a fully open state so that the hybrid vehicle's engine may be started when the hybrid vehicle is being propelled solely via an electric machine. The driveline disconnect clutch may transition from a state where there are space between clutch plates to a state where torque may begin to be transferred through the driveline disconnect clutch. It takes a finite amount of time to remove the space between clutch plates so that the driveline disconnect clutch may begin to transfer torque. The amount of time that it takes to remove the space between clutch plates delays torque transfer through the driveline disconnect clutch. One way to reduce the delay time is to provide a boost pressure to the driveline disconnect clutch. The boost pressure is an elevated pressure that is applied to the disconnect clutch at a beginning of clutch closing. The boost pressure may be effective to reduce driveline disconnect clutch closing time, but it may also contribute to driveline torque disturbances if the boost pressure is applied for a time that is longer or shorter than may be desired. Operating conditions such as transmission fluid temperature, line pressure, wear, and piece to piece variation may contribute to generation of boost times that may be longer or shorter than may be desired.

The inventors herein have recognized the above-mentioned issue and have developed a method for operating a vehicle, comprising: via one or more controllers, adjusting a boost phase duration for a driveline disconnect clutch closing sequence in response to a plurality of errors.

By adjusting a boost phase of a driveline disconnect clutch closing sequence in response to a plurality of errors, it may be possible to adapt driveline disconnect clutch operation to compensate for piece to piece variation, wear, transmission fluid temperature, and line pressure. Accordingly, adjusting the boost phase timing of a driveline disconnect clutch closing sequence may reduce the possibility of driveline torque disturbances.

The present description may provide several advantages. In particular, the approach may reduce driveline torque disturbances. Further, the approach may reduce driveline response time. Additionally, the approach may improve a vehicle's drivability.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
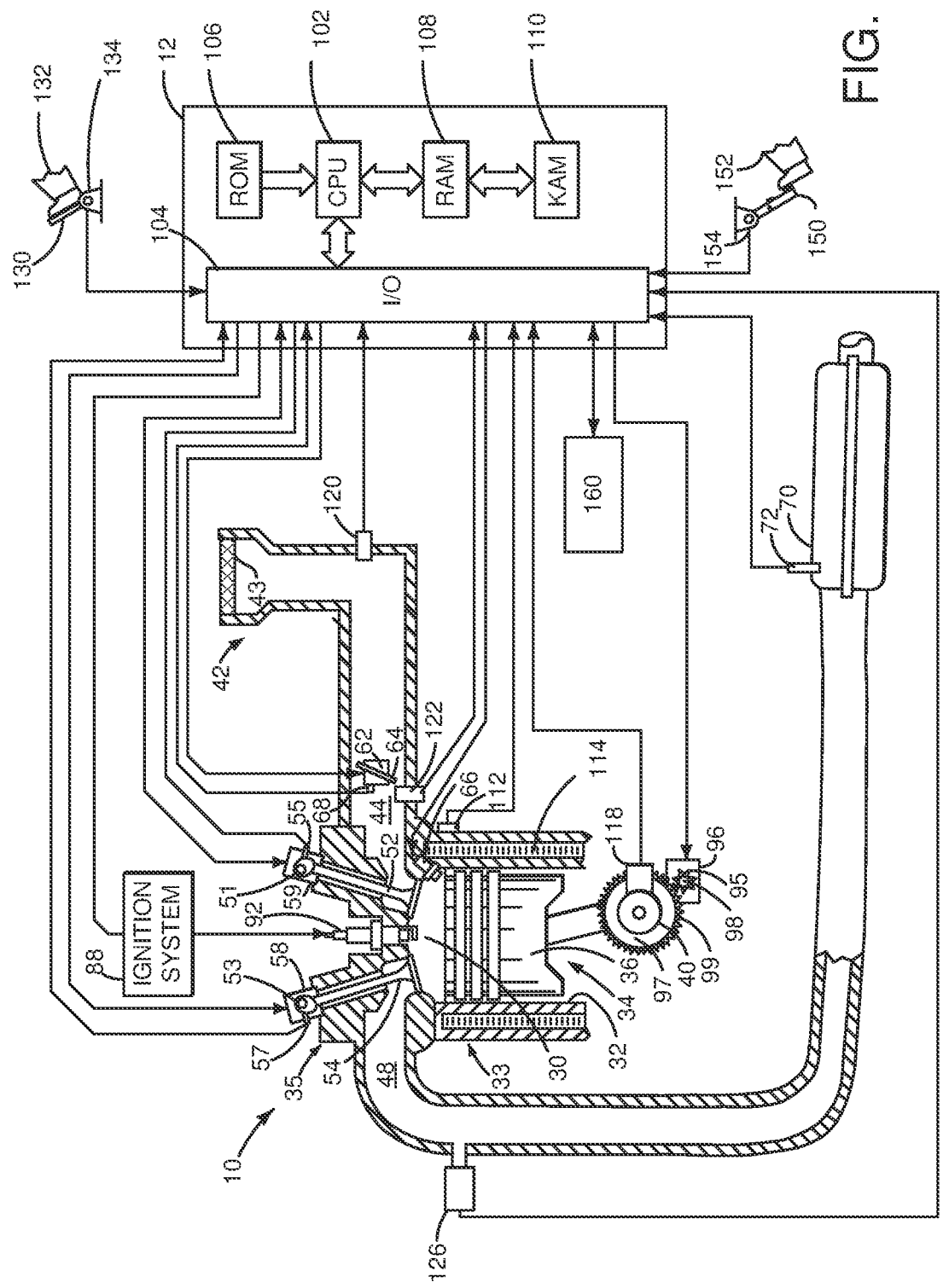
FIG. 1 is a schematic diagram of an engine.
Figure 2:
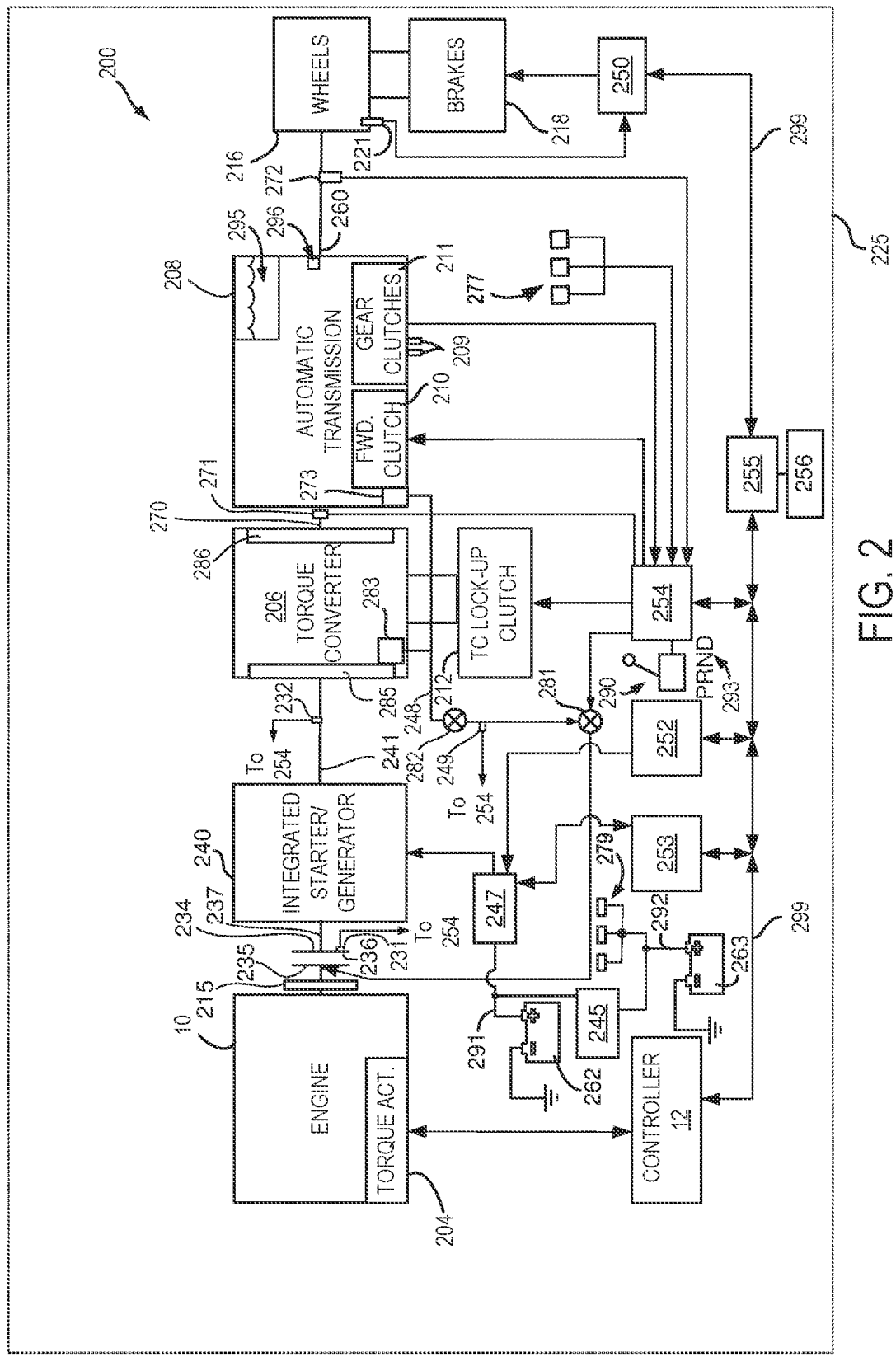
FIG. 2 is a schematic diagram of a hybrid vehicle driveline including the engine of FIG. 1.
Figure 3:
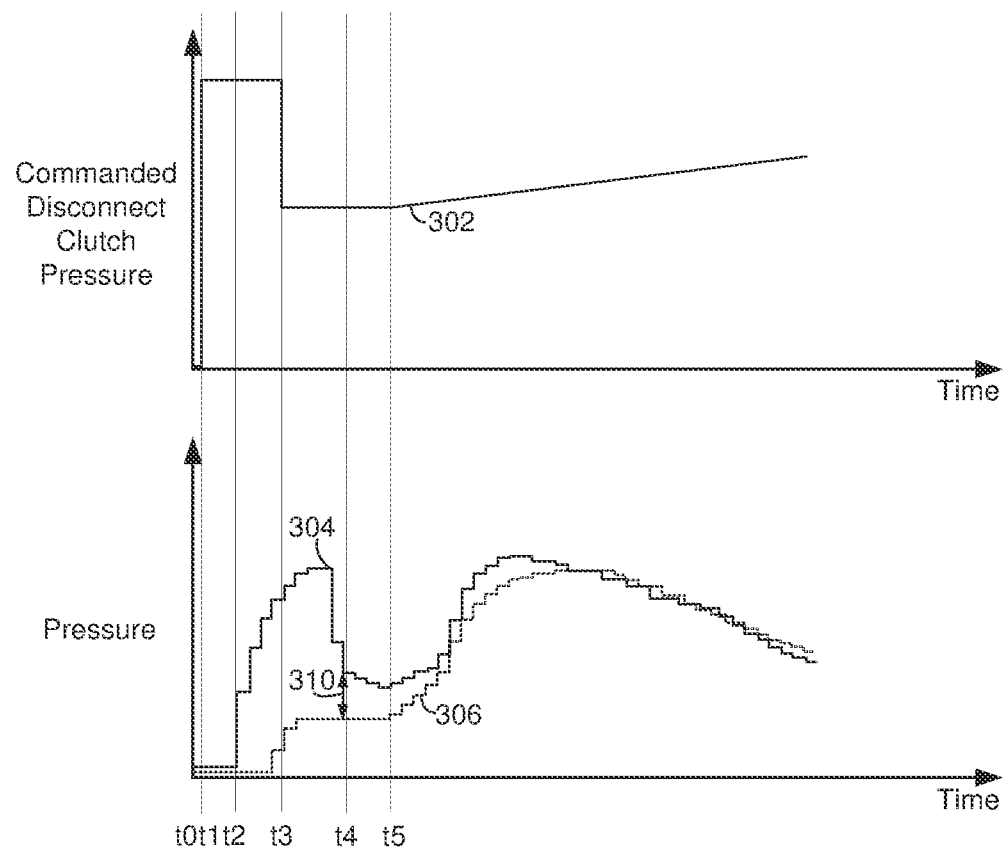
FIG. 3 shows example driveline disconnect clutch closing sequence.
Figure 4:
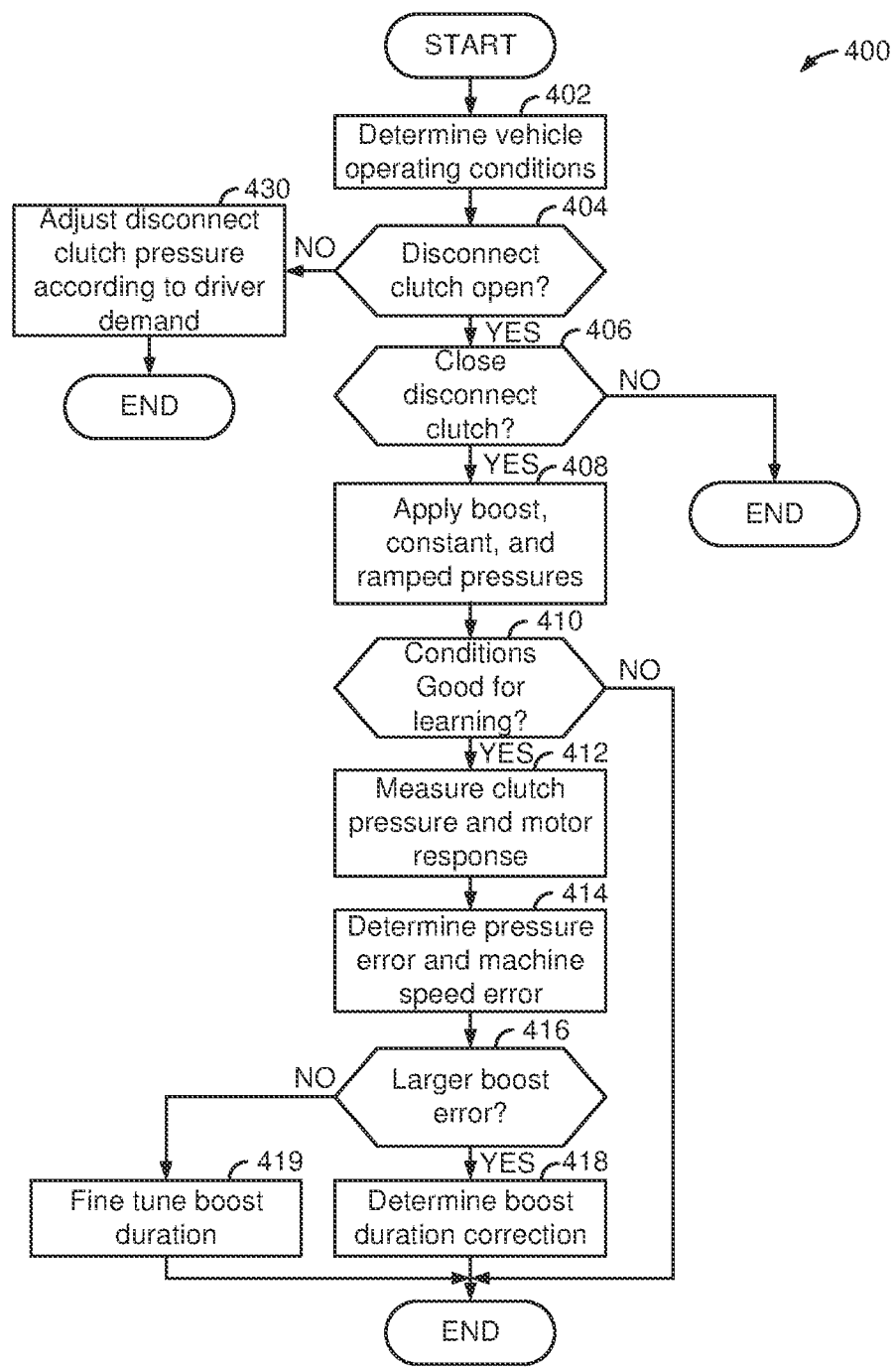
FIG. 4 shows a method for operating a driveline disconnect clutch.

The present description is related to improving operation of a driveline disconnect clutch of a hybrid vehicle. In particular, boost time for a driveline disconnect clutch may be adapted to compensate for piece to piece variability, wear, line pressure, and other variables that may influence operation of the driveline disconnect clutch. The boost time may be adjusted in response to one or more control parameters that may be indicative of more substantial boost errors. The boost time may be adapted as a function of operating variables so that the adapted boost times may allow the driveline disconnect clutch to engage consistently under a variety of operating conditions. The driveline disconnect clutch may be included in a driveline that includes an engine of the type that is shown in FIG. 1. The engine may be part of a hybrid powertrain or driveline as shown in FIG. 2. A driveline disconnect clutch engagement sequence according to the methods of FIG. 4 is shown in FIG. 3. FIG. 4 shows a flowchart of a method for adapting operation of a driveline disconnect clutch.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line or conduit 248 may receive transmission fluid 295 from electric transmission fluid pump 273 and/or pump 283. Pressure in conduit 248 (e.g., line pressure) may be sensed via pressure sensor 249 and pressure in driveline disconnect clutch 236 may be sensed via pressure sensor 231.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271 and speed of electric machine 240 via position sensor 232. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1–N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; and a controller including executable instructions stored in non-transitory memory that cause the controller to adjust a boost phase duration in response to a plurality of error values. In a first example, the system includes where the plurality of error values includes a pressure error. In a second example that may include the first example, the system includes where the plurality of error values includes an integral pressure error. In a third example that may include one or more of the first and second examples, the system includes where the plurality of error values includes a speed error. In a fourth example that may include one or more of the first through third examples, the system further comprises additional instructions to multiply the pressure error via a first weight factor, multiply the integral pressure error via a second weight factor, and multiply the speed error via a third weight factor. In a fifth example that may include one or more of the first through fourth examples, the system further comprises additional instructions to store the boost phase duration to controller memory.

Referring now to FIG. 3, a prophetic driveline disconnect clutch closing sequence is shown. The operating sequence of FIG. 3 may be provided via the system of FIGS. 1 and 2 in cooperation with the method of FIG. 4. The vertical lines at times t0-t5 represent times of interest during the operating sequence. The plots are time aligned.

The first plot from the top of FIG. 3 is a plot of commanded driveline disconnect clutch pressure versus time. The vertical axis represents commanded driveline disconnect clutch pressure and commanded driveline disconnect clutch pressure increases in the direction of the vertical axis arrow. The horizontal axis represents time and time increases from the left side of the plot to the right side of the plot. Trace 302 represents the commanded driveline disconnect clutch pressure. The commanded driveline disconnect clutch pressure may be converted driveline disconnect clutch torque capacity via a transfer function (not shown).

The second plot from the top of FIG. 3 is a plot of pressure versus time. The vertical axis represents pressure and pressure increases in the direction of the vertical axis arrow. The horizontal axis represents time and time increases from the left side of the plot to the right side of the plot. Trace 304 represents measured or observed pressure within the driveline disconnect clutch. Trace 306 represents an expected or modeled driveline disconnect clutch pressure.

At time t0, the driveline disconnect is fully open and the commanded driveline disconnect clutch pressure is zero. The measured pressure within the driveline disconnect clutch pressure is near zero and the modeled driveline disconnect clutch pressure is near zero.

At time t1, the driveline disconnect clutch boost phase begins and the commanded driveline disconnect clutch pressure is commanded to a boost pressure, which may alternatively be referred to as a driveline disconnect clutch filling pressure. The boost pressure may be a function of transmission fluid temperature, engine starting urgency, and/or other operating conditions. The boost pressure is greater than the pressure that is commanded in a stroke or constant pressure phase that follows the boost phase. The boost pressure is a pressure that is applied to generate a hydraulic transient to get hydraulic fluid moving between the hydraulic control valve and the driveline disconnect clutch. The measured pressure within the driveline disconnect clutch and the modeled driveline disconnect clutch pressure remain unchanged.

At time t2, the commanded driveline disconnect clutch pressure remains at the boost pressure level and the measured driveline disconnect clutch pressure begins to increase. The modeled driveline disconnect clutch pressure remains unchanged. The measured driveline disconnect clutch pressure is shown lagging the commanded driveline disconnect clutch pressure. The lag may be due to valve operation, conduit size, and a volume of fluid between the driveline disconnect clutch and the control valve. Shortly before time t3 the modeled driveline disconnect clutch pressure begins to increase.

At time t3, the driveline disconnect clutch boost phase ends and the commanded driveline disconnect clutch pressure is commanded to a stroke pressure or a constant pressure that is lower than the boost pressure. The stroke pressure is a pressure at which the driveline disconnect clutch begins to gain torque transferring capacity. The stroke phase, which may be referred to as the constant pressure phase, of closing the driveline disconnect clutch begins at time t3. The stroke phase is a phase of driveline disconnect clutch closing where space and/or fluid between driveline disconnect clutch plates is reduced so that the driveline disconnect clutch may begin to transfer torque.

At time t4, the pressure difference between the measured pressure 304 and the modeled pressure 306 is determined. The pressure difference between measured pressure 304 and modeled pressure may be determined at a particular time during the stroking phase. For example, the pressure difference may be determined half way through the stroke phase. In one example, the particular time that the pressure difference between the measured pressure 304 and the modeled pressure 306 is determined may be based on the time where the magnitude of the pressure difference is expected to be a smaller value when the driveline disconnect clutch is neither under boosted nor over boosted, and a larger value when the magnitude of the pressure difference is expected to be a larger value when the driveline disconnect clutch is under boosted or over boosted. In some examples, the pressure error may be integrated from time t3 to t5 in order to provide compensation for pressure error over the entire stroke phase.

At time t5, the stroke phase ends and the ramping or torque transfer phase begins. During the ramping phase, the pressure within the driveline disconnect clutch may be commanded to an increased value that is expected to keep the driveline disconnect clutch at a requested torque capacity. The pressure may be increased when the driver demand torque is at a higher value and the pressure may be adjusted to provide the requested driveline disconnect clutch torque capacity.

In this way, pressure supplied to a driveline disconnect clutch may be sampled via a controller to determine whether or not the requested boost pressure and duration are providing the desired driveline disconnect clutch response. The pressure values along with other metrics, such as electric machine speed change, may be a basis for adjusting boost pressure duration.

Referring now to FIG. 4, a method for operating an engine of a hybrid vehicle is shown. The method of FIG. 4 may be at least partially implemented as executable instructions stored in memory of one or more controllers in the system of FIGS. 1 and 2. Further, the method of FIG. 4 may include actions taken in the physical world by one or more controllers to transform an operating state of the system of FIGS. 1 and 2. Additionally, the method of FIG. 4 may provide at least portions of the operating sequence shown in FIG. 3.

At 402, method 400 determines vehicle operating conditions. Vehicle operating conditions may include but are not limited to vehicle speed, driver demand torque or power, engine temperature, integrated starter/generator speed and torque, engine speed, transmission fluid temperature, and state of battery charge. Method 400 proceeds to 404.

At 404, method 400 judges whether the driveline disconnect clutch is fully open. If method 400 judges that the driveline disconnect clutch is fully open, the answer is yes and method 400 proceeds to 406. Otherwise, the answer is no and method 400 proceeds to 430. In one example, method 400 may judge whether or not the driveline disconnect clutch is fully open based on a pressure of fluid that is supplied to the driveline disconnect clutch.

At 430, method 400 adjusts a pressure of fluid that is supplied to the driveline disconnect clutch in response to driver demand torque plus a margin pressure. For example, if driver demand is 200 Newton-meters, the pressure of fluid that is supplied to the driveline disconnect clutch is adjusted to a value at which the driveline disconnect clutch capacity is 200 Newton-meters plus a margin pressure that results in a driveline disconnect clutch margin capacity (e.g., 25 Newton-meters). Method 400 proceeds to exit.

At 406, method 400 judges whether or not closing of the driveline disconnect clutch is requested. The driveline disconnect clutch may be requested to close in response to increasing driver demand, decreasing battery state of charge, a low emissions system device temperature, or other conditions. If method 400 judges that driveline disconnect clutch closing is requested, the answer is yes and method 400 proceeds to 408. Otherwise, the answer is no and method 400 proceeds to exit.

At 408, method 400 commands the driveline disconnect clutch to close according to a predetermined closing sequence. In one example, the predetermined closing sequence may include a boost phase, a stroke phase, and an engagement phase as shown in FIG. 3. Method 400 may reference tables and/or functions in controller memory to determine the boost pressure to command the driveline disconnect clutch during the boost phase, the boost duration (e.g., the amount of time that the boost pressure is commanded), the stroke pressure to command the driveline disconnect clutch during the stroke phase, the stroke duration (e.g., the amount of time that the stroke pressure is commanded), and the initial engagement phase command pressure. The boost pressure and stroke pressures may be functions of transmission fluid temperature, driver demand urgency level, and other operating conditions. Method 400 commands the driveline disconnect clutch to pressures in the boost phase, stroke phase, and engagement phase to close the driveline disconnect clutch. Method 400 proceeds to 410.

At 410, method 400 judges whether or not vehicle operating conditions are conducive to learn and adapt boost pressure and boost duration. In one example, the operating conditions may include but are not limited to the amount of time since boost pressure and boost duration were most recently adapted, the amount that boost pressure and boost duration were most recently adapted (e.g., the amount or value that the control parameters changed), and whether or not transmission fluid temperature is within a predetermined range. If method 400 judges that operating conditions are conducive to be adapted or learned, the answer is yes and method 400 proceeds to 412. Otherwise, the answer is no and method 400 proceeds to exit.

At 412, method 400 measures driveline disconnect clutch pressure and electric machine speed. Method 400 may sample or measure pressure within or at the driveline disconnect clutch at a particular time during the stroke phase of closing the driveline disconnect clutch. In one example, the particular time that the driveline disconnect clutch pressure is sampled may be based on a time when there is expected to be a largest separation between measured driveline disconnect clutch pressure and modeled driveline disconnect clutch pressure so that the signal to noise ratio of the error value that is determined from the pressure measurement may be larger than a threshold. In this way, boost timing compensation may be based on a single pressure measurement taken at a particular time during the stroke phase of closing the driveline disconnect clutch.

Method 400 may also take a plurality of driveline disconnect clutch pressure measurements during the stoke phase for the purpose of integrating the pressure error during the stroke phase. For example, method 400 may sample driveline disconnect clutch pressure via a controller at fixed time intervals (e.g., every 10 milliseconds) from the beginning of the stroke phase to the end of the stroke phase. By integrating the pressure error, method 400 may get a reading of driveline disconnect clutch operation over the entire stroke phase, which may provide improved insight to driveline disconnect closing operation.

In addition to sampling driveline disconnect clutch pressure, the inventors have determined that electric machine speed may be indicative of driveline disconnect clutch operation during closing of a driveline disconnect clutch. For example, if electric machine speed is less than an expected speed at a particular time during the stroke phase of driveline disconnect clutch closing, it may be determined that an over boost condition is present so that the boost time duration may be reduced to improve driveline disconnect clutch closing. Conversely, if electric machine speed is greater than an expected speed at a particular time during the stroke phase of driveline disconnect clutch closing, it may be determined that an under boost condition is present so that the boost time duration may be increased to improve driveline disconnect clutch closing. Therefore, method 400 may sample and record electric machine speed at a particular time during the driveline disconnect clutch closing sequence. In one example, the particular time that the electric machine speed is sampled may be based on a time when there is expected to be a largest separation between measured electric machine speed and modeled or expected electric machine speed so that the signal to noise ratio of the error value that is determined from the speed measurement may be larger than a threshold. Method 400 proceeds to 414.

At 414, method 400 determines pressure error and speed error values. If driveline disconnect clutch pressure is measured at a predetermined time during the stroke phase, the driveline disconnect clutch pressure error may be determined via the following equation:

$$P_{err} = P_{Meas} - P_{expect}$$

where $P_{err}$ is the driveline disconnect clutch pressure error for the driveline disconnect clutch closing sequence, $P_{Meas}$ is the driveline disconnect clutch that was measured after the boost phase and during the stroke phase, and $P_{expect}$ is the expected or modeled driveline disconnect clutch pressure at the time that the driveline disconnect clutch pressure measurement was taken.

If electric machine speed is measured at a predetermined time during the stroke phase, the electric machine speed error may be determined via the following equation:

$$EMS_{err} = EMS_{Meas} - EMS_{expect}$$

where $EMS_{err}$ is the electric machine speed error for the driveline disconnect clutch closing sequence, $EMS_{meas}$ is the electric machine speed that was measured after the boost phase and during the stroke phase, and $EMS_{expect}$ is the expected or modeled electric machine speed at the time that the electric machine speed measurement was taken.

In some examples where the integral of the pressure error is determined, the integral of the pressure error may be approximated via the following equation:

$$INT_{err} = \sum_{i=1}^{N} (P_{Meas}(i) - P_{expect}(i)) \cdot dt$$

where $INT_{err}$ is the approximated integrated pressure error, i is the sample number, N is the number of the last pressure sample, dt is the amount of time between pressure measurements, $P_{Meas}$ is the pressure measured at sample i, $P_{expect}$ is the expected or modeled pressure at sample i, and i is the pressure sample number.

The expected or modeled driveline disconnect clutch pressure may be determined via the following equation:

$$P_{expect} = f1(t\_close, Tf, CDDp)$$

where f1 is a function that returns the modeled driveline disconnect clutch pressure, t_close is an amount of time since the driveline disconnect clutch was commanded closed, Tf is transmission fluid temperature (e.g., temperature of fluid that closes the driveline disconnect clutch), and CDDp is the commanded driveline disconnect clutch pressure or capacity. Method 400 proceeds to 416.

At 416, method 400 judges whether or not one or more larger errors were present during the driveline disconnect clutch closing sequence. Method 400 may apply one or a combination of methods described herein to determine whether or not larger boost error is present. In one example, method 400 may judge that a larger over boost error is present if $P_{err}$ is greater than a first threshold pressure, if $INT_{err}$ is greater than a first threshold value, or if $EMS_{err}$ is less than a first threshold speed error. Alternatively, method 400 may determine that a larger over boost error is present if $P_{err}$ is greater than the first threshold pressure and $INT_{err}$ is greater than the first threshold value and $EMS_{err}$ is less than the first threshold speed error. By referencing a plurality of error values to determine the presence or absence of over boost error, the possibility of generating false positive indications of boost error may be reduced. In addition, the integrated error value may provide a better indication of the significance of the driveline disconnect clutch closing error as compared to evaluating error at a single point in time because errors that occur early during the stroke phase or late in the stroke phase may be considered.

In addition, method 400 may judge that a larger under boost error is present if $P_{err}$ is less than a second threshold pressure, if $INT_{err}$ is less than a second threshold value, or if $EMS_{err}$ is greater than a second threshold speed error. Alternatively, method 400 may determine that a larger under boost error is present if $P_{err}$ is less than the second threshold pressure and $INT_{err}$ is less than the second threshold value and $EMS_{err}$ is greater than the second threshold speed error. By referencing a plurality of error values to determine the presence or absence of under boost error, the possibility of generating false positive indications of boost error may be reduced. If method 400 judges that larger boost errors are present, the answer is yes and method 400 proceeds to 418. Otherwise, method 400 proceeds to 419.

At 419, method 400 performs fine tuning adjustments to boost timing duration. Method 400 selects a value of a weighting factor w1 for driveline disconnect clutch pressure or capacity error. In one example, the weighting factor w1 for driveline disconnect clutch pressure error may be empirically determined via adjusting the weighting factor w1 and monitoring the driveline disconnect clutch pressure error during and after closing the driveline disconnect clutch. The empirically determined weighting factor w1 may be stored in controller memory and it may be retrieved during learning of the driveline disconnect clutch pressure error. In one example, the weighting factor w1 for the driveline disconnect clutch pressure error may be a function of operating conditions (e.g., driveline disconnect clutch boost pressure error, commanded driveline disconnect clutch pressure, and transmission fluid temperature) and the weighting factor w1 may be retrieved from controller memory via referencing a function or table according to the commanded driveline disconnect clutch pressure and transmission fluid temperature.

Method 400 may also determine a driveline disconnect clutch response delay error. Method 400 monitors a pressure of fluid that is supplied to the driveline disconnect clutch and determines the response delay based on the pressure of fluid that is supplied to the driveline disconnect clutch. Alternatively, the driveline disconnect clutch response delay may be determined from an estimated driveline disconnect clutch torque capacity that is based on driveline disconnect clutch pressure. In particular, method 400 determines a time at which estimated driveline disconnect clutch capacity reaches a fixed threshold/fraction such as 63% of its final commanded value, where the driveline disconnect clutch capacity may be estimated from driveline disconnect clutch pressure.

Method 400 also estimates the pressure of fluid that is supplied to the driveline disconnect clutch via a model. The model may output driveline disconnect clutch pressure as a function of a commanded driveline disconnect clutch pressure or capacity and transmission fluid pressure. Method 400 determines the driveline disconnect clutch response delay error via the following equation:

$$DIS\_Dly\_err = (DISMod\_prs\_63 - DIS\_prs\_63)$$

where DIS_Dly_err is the driveline disconnect clutch response delay error, DISMod_prs_63 is the modeled driveline disconnect clutch pressure at a time when the modeled driveline disconnect clutch pressure reaches substantially a fixed fraction such as 63% (e.g., within +10% of the modeled driveline disconnect clutch pressure) of its final commanded value, and where DIS_prs_63 is the measured or observed driveline disconnect clutch pressure at a time when the measured or observed driveline disconnect clutch pressure reaches substantially 63% (e.g., within ±10% of the modeled driveline disconnect clutch pressure) of its final commanded value. The fixed fraction such as 63% threshold value for both the modeled driveline disconnect clutch pressure and the measured or observed driveline disconnect clutch pressure is based on the stroke threshold and a commanded pressure value Method 400 selects a value of a weighting factor w2 for driveline disconnect clutch response delay error. In one example, the weighting factor w2 for driveline disconnect clutch response delay error may be empirically determined via adjusting the weighting factor w2 and monitoring the driveline disconnect clutch response delay error during and after closing the driveline disconnect clutch. The empirically determined weighting factor w2 may be stored in controller memory and it may be retrieved during learning of the driveline disconnect clutch response delay error. In one example, the weighting factor w2 for the driveline disconnect clutch response delay error may be a function of operating conditions (e.g., magnitude of driveline disconnect clutch response error, commanded driveline disconnect clutch pressure and transmission fluid temperature) and the weighting factor w2 may be retrieved from controller memory via referencing a function or table according to the commanded driveline disconnect clutch pressure and transmission fluid temperature.

Method 400 converts the driveline disconnect clutch response delay error and the driveline disconnect clutch application pressure error to a boost correction value. In one example, the driveline disconnect clutch response delay error and the driveline disconnect clutch application pressure error may be applied to control boost pressure duration according to the following equation:

$$FF\_boost = f2(Tf, ImpN, EngN) + AdptCor$$

where FF_boost is the duration that boost pressure is applied to open the driveline disconnect clutch, f2 is a function that returns an open loop boost pressure duration (e.g., 200 milliseconds) Tf is temperature of the fluid that is supplied to open the driveline disconnect clutch, ImpN is torque converter impeller speed, EngN is engine speed, and AdptCor is an adaptive correction term for adjusting the boost pressure during closing of the driveline disconnect clutch.

The adaptive boost pressure duration correction term may be described via the following equation:

$$AdptCor = (wt1 \cdot old\_AdptCor) + (wt2 \cdot CFerr)$$

where AdptCor is the adaptive correction term, wt1 is the weighting factor for old adaptive correction and may be a function of operating conditions (similar to previously described w1 and w2), old_AdptCor is a most recent prior AdptCor value, wt2 is the weighting factor for new adaptive correction and may be a function of operating conditions (similar to previously described w1 and w2), and CFerr is the boost pressure duration correction. The boost pressure duration correction may be determined via the following equation:

$$CFerr = f3(DIS\_Pres\_err, CDDp) \cdot w3 + f4(DIS\_DLy\_err, CDDp) \cdot w4 \quad (7)$$

where f3 is a function that returns a first boost pressure adjustment value, w3 and w4 are adjustable weighting factors (numerical values) which may be a function of operating conditions (similar to previously described weighting factors), and f4 is a function that returns a second boost pressure adjustment. Thus, the boost pressure duration may be adjusted in response to a driveline disconnect clutch pressure error and a driveline disconnect clutch response delay. Alternatively, the boost pressure magnitude may be adjusted via a similar equation. Method 400 may also save or store to controller memory (e.g., RAM) the adapted boost pressure duration correction AdptCor. Method 400 also opens the driveline disconnect clutch according to the correction factor AdptCor when driveline disconnect clutch opening is requested In other examples, method 400 may fine tune the boost timing in an alternative way. Method 400 proceeds to exit.

At 418, method 400 converts the driveline disconnect clutch errors to a boost correction value. In one example, the driveline disconnect errors may be applied to control boost pressure duration according to the following equation:

$$FF\_boost = f2(Tf, ImpN, EngN) + AdptCor$$

where FF_boost is the duration that boost pressure is applied to open the driveline disconnect clutch, f2 is a function that returns an open loop boost pressure duration (e.g., 200 milliseconds) Tf is temperature of the fluid that is supplied to open the driveline disconnect clutch, ImpN is torque converter impeller speed, EngN is engine speed, and AdptCor is an adaptive correction term for adjusting the boost pressure during closing of the driveline disconnect clutch.

The adaptive boost pressure duration correction term may be described via the following equation:

$$AdptCor = (wt5 \cdot f4(P_{err})) + (wt6 \cdot f5(INT_{err}) + wt7 \cdot f6(EMS_{err}))$$

where AdptCor is the adaptive correction term, wt5 is the weighting factor, f4 is a function that returns an adjustment value that is based on a single pressure error value, Pen is the pressure error as previously described, wt6 is a weighting factor, f5 is a function that returns an adjustment value that is based in integrated error, INTerr is integrated error as previously described, w7 is a weighting factor, f6 is a function that returns an adjustment value that is based on electric machine speed error, EMSerr is electric machine speed error. The weighting factor values wt5, wt6, and wt7 and functions f4, f5, and f6 may be stored in tables or functions in controller memory. The weighting factors and functions may be empirically determined via adjusting the factors and functions while repeatedly opening and closing the driveline disconnect clutch at different transmission fluid temperatures and impeller speeds. By applying a single pressure error, an integrated pressure error, and an electric machine speed error to adjust boost time duration, driveline disconnect clutch adaption may improve. In particular, the integrated pressure error may compensate for driveline disconnect clutch boost errors that occur at the beginning, middle, and end of the driveline closing sequence so that the boost timing adjustment may compensate for errors during the entire stroke phase of the driveline disconnect clutch closing sequence. The electric machine speed errors may also be applied to improve boost pressure adjustments because the error in electric machine speed allows for compensation that is based on the actual amount of torque that is being transferred through the driveline disconnect clutch (e.g., the torque that is transferred may affect electric machine speed), which may provide better compensation for driveline disconnect clutch wear as compared to adjustments that are solely pressure based. Method 400 stores the correction factor AdptCor in controller memory (e.g., RAM) and opens the driveline disconnect clutch according to the correction factor AdptCor when driveline disconnect clutch opening is requested. Method 400 proceeds to exit.

In this way, driveline disconnect boost pressure duration may be adjusted according to a plurality of errors. The errors may include one time pressure error, integral of pressure error, and electric machine error. The different errors may be affected by the boost duration time in different ways so adjusting the boost duration according to the plurality of error may improve driveline disconnect clutch operation.

The method of FIG. 4 provides for a method for operating a vehicle, comprising: via one or more controllers, adjusting a boost phase duration for a driveline disconnect clutch closing sequence in response to a plurality of errors. In a first example, the method includes where the plurality of errors include an integrated pressure. In a second example that may include the first example, the method includes where the plurality of errors include a pressure difference. In a third example that may include one or both of the first and second examples, the method includes where the plurality of errors include a speed error of an electric machine. In a fourth example that may include one or more of the first through third examples, the method includes where the electric machine is positioned in a driveline between an engine and a torque converter. In a fifth example that may include one or more of the first through fourth examples, the method further comprises saving the boost phase duration to controller memory after adjusting the boost phase duration. In a sixth example that may include one or more of the first through fifth examples, the method further comprises closing a driveline disconnect clutch prior to adjusting the boost phase duration. In a seventh example that may include one or more of the first through sixth examples, the method includes where the plurality of errors are based on the closing of the driveline disconnect clutch, and further comprising: commanding the driveline disconnect clutch to open based on the plurality of errors. In an eighth example that may include one or more of the first through seventh examples, the method includes where the driveline disconnect clutch closing sequence includes a boost phase and a stroke phase.

The method of FIG. 4 also provides for a method for operating a vehicle, comprising: via one or more controllers, adjusting a boost phase duration for a driveline disconnect clutch closing sequence in response to a sum of a plurality of weighted error values; and adjusting opening of a driveline disconnect clutch according to the adjusted boost phase duration. In a first example, the method includes where the plurality of weighted error values includes a pressure error. In a second example that may include the first example, the method includes where the plurality of weighted error values includes an integrated pressure error. In a third example that may include one or both of the first and second examples, the method includes where the plurality of weighted error values includes an electric machine speed error. In a fourth example that may include one or more of the first through third examples, the method further comprises closing a driveline disconnect clutch prior to adjusting the boost phase duration.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, 13, 14, IS, V6, V8, V10, and V12 engines operating in natural gas, gasoline, diesel, or alternative fuel configurations could use the present description to advantage.

The invention claimed is:

1. A method for operating a vehicle, comprising:
   via one or more controllers, adjusting a boost phase duration for a driveline disconnect clutch closing sequence in response to a plurality of errors.

2. The method of claim 1, where the plurality of errors include an integrated pressure.

3. The method of claim 1, where the plurality of errors include a pressure difference.

4. The method of claim 1, where the plurality of errors include a speed error of an electric machine.

5. The method of claim 4, where the electric machine is positioned in a driveline between an engine and a torque converter.

6. The method of claim 1, further comprising saving the boost phase duration to controller memory after adjusting the boost phase duration.

7. The method of claim 6, further comprising closing a driveline disconnect clutch prior to adjusting the boost phase duration.

8. The method of claim 7, where the plurality of errors are based on the closing of the driveline disconnect clutch, and further comprising:
commanding the driveline disconnect clutch to open based on the plurality of errors.

9. The method of claim 8, where the driveline disconnect clutch closing sequence includes a boost phase and a stroke phase.

10. A system, comprising:
an internal combustion engine;
an integrated starter/generator;
a disconnect clutch positioned in a driveline between the internal combustion engine and the integrated starter/generator; and
a controller including executable instructions stored in non-transitory memory that cause the controller to adjust a boost phase duration in response to a plurality of error values.

11. The system of claim 10, where the plurality of error values includes a pressure error.

12. The system of claim 11, where the plurality of error values includes an integral pressure error.

13. The system of claim 12, where the plurality of error values includes a speed error.

14. The system of claim 13, further comprising additional instructions to multiply the pressure error via a first weight factor, multiply the integral pressure error via a second weight factor, and multiply the speed error via a third weight factor.

15. The system of claim 10, further comprising additional instructions to store the boost phase duration to controller memory.

16. A method for operating a vehicle, comprising:
via one or more controllers, adjusting a boost phase duration for a driveline disconnect clutch closing sequence in response to a sum of a plurality of weighted error values; and
adjusting opening of a driveline disconnect clutch according to the adjusted boost phase duration.

17. The method of claim 16, where the plurality of weighted error values includes a pressure error.

18. The method of claim 17, where the plurality of weighted error values includes an integrated pressure error.

19. The method of claim 18, where the plurality of weighted error values includes an electric machine speed error.

20. The method of claim 16, further comprising closing the driveline disconnect clutch prior to adjusting the boost phase duration.

* * * * *